(No Model.) 2 Sheets—Sheet 1.

H. H. WARDWELL.
SECONDARY BATTERY.

No. 443,556. Patented Dec. 30, 1890.

Witnesses
Jos. S. Latimer
Carleton Ebnell

Inventor
Harry H. Wardwell
by Arthur T. Brown
his Attorney (No Model.) 2 Sheets—Sheet 2.
H. H. WARDWELL.
SECONDARY BATTERY.
No. 443,556. Patented Dec. 30, 1890.
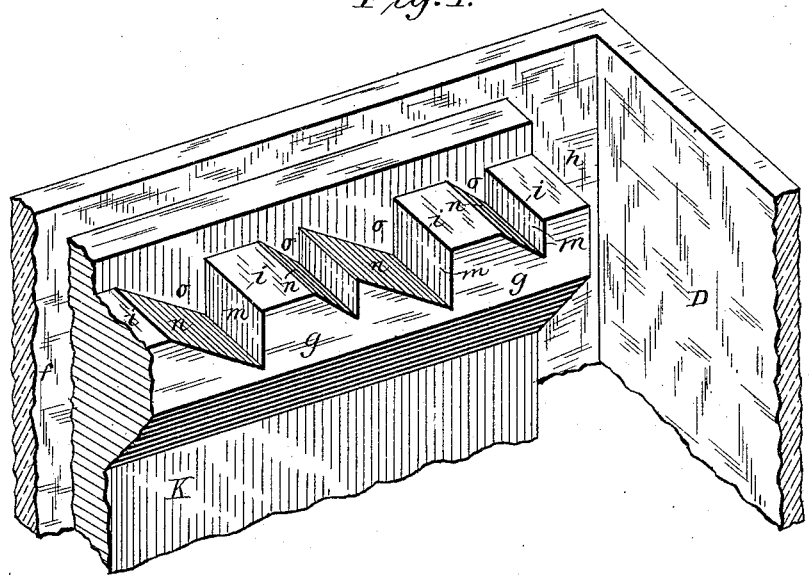
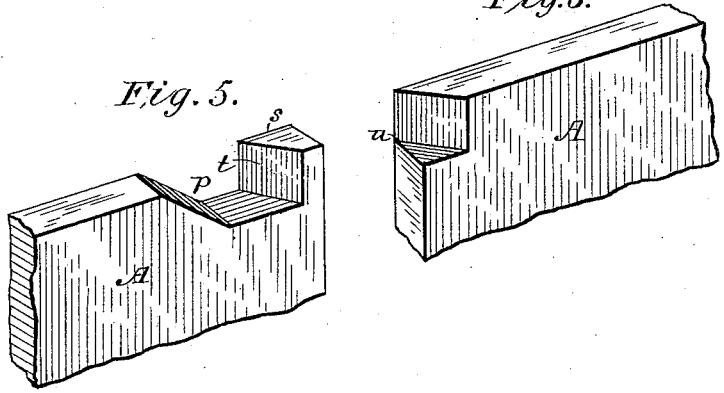
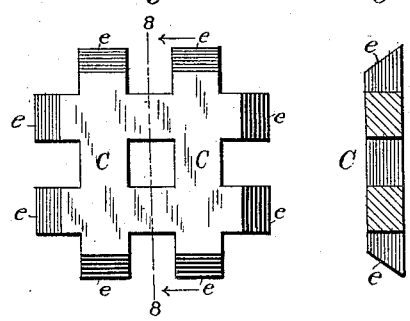
Witnesses
Jos. S. Latimer
Carlton ...
Inventor
Harry H. Wardwell
by Arthur ... Brown
His Attorney

UNITED STATES PATENT OFFICE.

HARRY H. WARDWELL, OF LAKE VILLAGE, NEW HAMPSHIRE.

SECONDARY BATTERY.

SPECIFICATION forming part of Letters Patent No. 443,556, dated December 30, 1890.

Application filed September 2, 1890. Serial No. 363,790. (No model.)

*To all whom it may concern:*

Be it known that I, HARRY H. WARDWELL, of Lake Village, in the county of Belknap and State of New Hampshire, have invented certain new and useful Improvements in Secondary Batteries, of which the following is a specification.

The present improvements relate to the means for securing the active material to the plates or electrodes of a secondary battery, to the construction of the plates, to the construction of the cell or battery case, to the means for connecting the positive and negative plates or electrodes in series and for connecting the positive plates or electrodes of one cell or case with the negative plates or electrodes of an adjacent cell or case, and to the means for insuring the insulation of adjacent plates in the same cell or case.

The improvements are illustrated in the accompanying drawings, in which—

Figure 1:
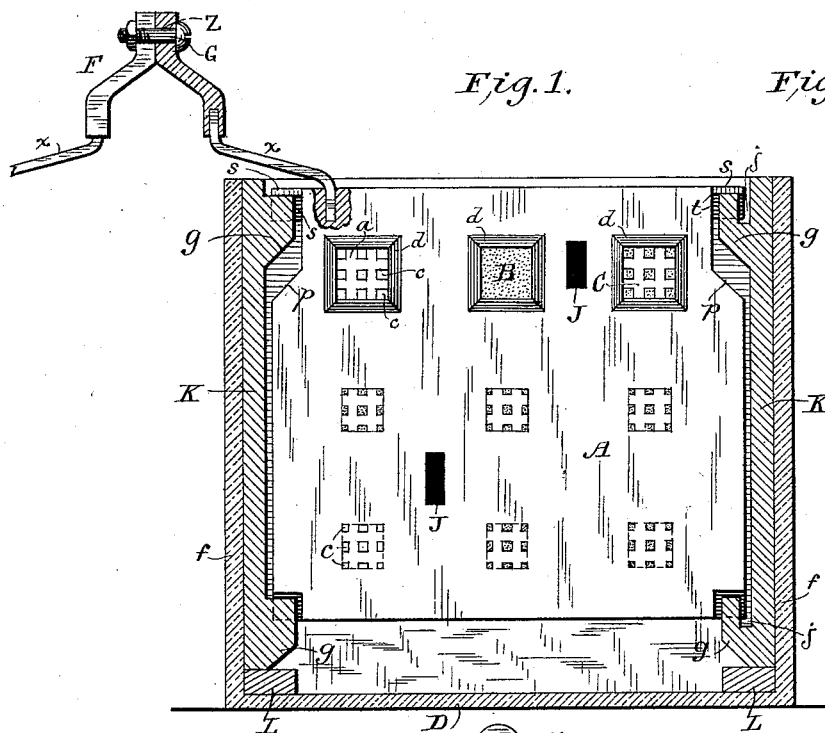
Figure 3:
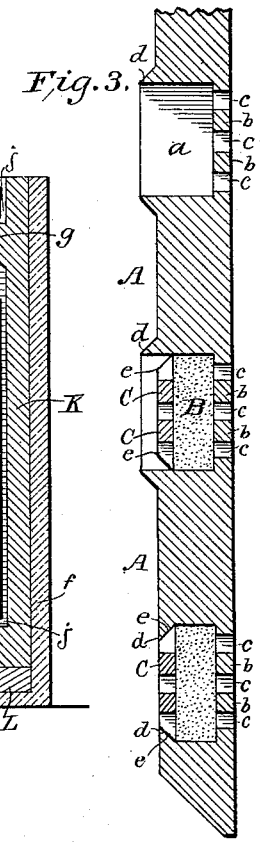
Figure 2:
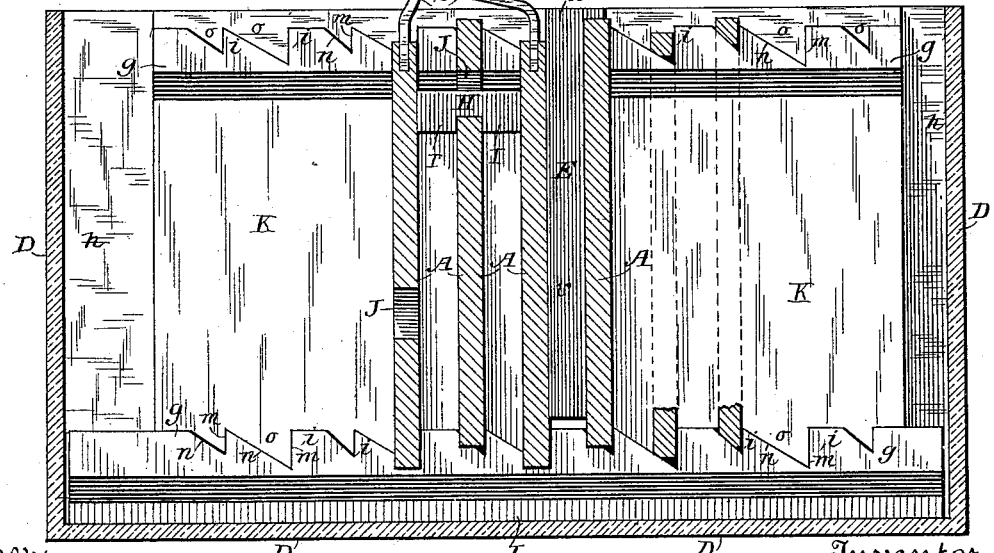

Figure 1 is a vertical section of the battery cell or case, the section being taken between two of the plates or electrodes, so as to show a side view of the same. This figure shows the plate in its primary, completed, and intermediate condition. Fig. 2 is a vertical section of the battery cell or case in a plane at right angles to that shown in Fig. 1, this figure illustrating the means for supporting the plates or electrodes. Fig. 3 is a cross-section of one of the plates on an enlarged scale. Fig. 4 is a perspective view, on an enlarged scale, of one corner of the battery cell or case. Fig. 5 is a perspective view, on an enlarged scale, of an upper corner of one of the plates or electrodes. Fig. 6 is a perspective view, on an enlarged scale, of a lower corner of one of the plates or electrodes. Fig. 7 is a plan view, on an enlarged scale, of one of the covers of the cells or cavities in the plates or electrodes. Fig. 8 is a vertical section thereof in a plane indicated by the line 8 8 in Fig. 7.

In carrying out the first portion of the invention, relating to the means for securing the active material to the plates or electrodes, each plate A is primarily formed with a plurality of apertures or cavities $a\, a$. The plates or electrodes A are composed of any suitable materials such as are well known in the art, being by preference, however, composed of lead. These cavities are primarily formed in the plates by casting or otherwise. Each cavity extends laterally partly through the plate in which it is formed, and it is entirely open on one side. On the opposite side, however, of the plate the cavity is closed by a thin retaining-wall $b$, which constitutes an integral wall $b$, which is perforated with a plurality of small apertures $c\, c$, establishing communication on that side of the plate with the cavity $a$. Around the margin of the open side or mouth of each cavity the plate is primarily formed with a slightly-raised peripheral ledge $d$, integral with the plate and projecting outwardly beyond the general surface thereof. These cavities $a\, a$ may be of any desired shape—circular or polygonal—and of any suitable size, and each plate or electrode is provided with any desired number of the cavities. These cavities constitute chambers for holding the active material B.

As far as thus described the plate or electrode possesses no novelty, being substantially the same as the plates or electrodes set forth in Letters Patent of the United States granted to me March 25, 1890, No. 424,152.

In accordance with the present invention the active material is placed directly into the cavities $a\, a$. The active material employed is preferably red lead or litharge; but any of the active materials known in the art may be employed. When the cavities are filled with the active material, they are closed by covers C. Each cover is reticulated, being an open or lattice work flat cover having a plurality of interstices, as shown. The cover is preferably made of the same material as the plates A. Each cover is beveled along its outer margins, as shown at $e\, e$ in Figs. 7 and 8. Each cover is placed within one of the cells or cavities $a$ with its inner face seating against the active material and with its beveled margins $e\, e$ on the outside adjacent to the ledges $d\, d$, as shown most clearly at the center cavity in Fig. 3. When all of the covers are so placed, the ledges $d\, d$ are flattened down. This can be conveniently done by passing the plate between rollers. By this means the face of the plate on which the ledges are formed is rendered flat. The ledges are pressed down into the triangular spaces between the beveled margins of the covers and the side walls of the cavities, as shown at the lower cavity in Fig. 3, and the covers are thus securely fastened in place. The covers thus made and applied hold the active material in place, and at the same time the battery-fluid finds ready access to the active materials through the interstices in the covers as well as through the apertures $c$ $c$ in the walls $b$. The plates $A$, being thus made and in condition for use, are placed in the battery cell or case $D$. This case is of proper height and width to receive the plates, and is of a sufficient length to receive any desired number of the plates. The case is made of any suitable insulating material, and is preferably made of cast-glass. In order that the case may hold the plates in proper relative position, special constructions of the case and plates are provided. The ends and bottom of the case have no special features of construction. Adjacent to each side wall $f$ of the case is placed a plate $K$, each of the two plates thus provided being of any suitable insulating material, such as (by preference) cast-glass. Each supporting-plate $K$ is provided on its inner face with two horizontally-extending inwardly-projecting ribs, bars, or flanges $g$ $g$. One of these ribs extends lengthwise of the supporting-plate a short distance above and parallel with the bottom of the case. The other rib is parallel with the bottom rib and extends lengthwise of the supporting-plate just below the open top of the case.

The supporting-plates $K$ are not as long as the inner face of the side wall, so that inserting-spaces $h$ $h$ are left at one or both ends of the plates between them and the ends of the case, as shown. It is not necessary that these spaces $h$ should extend to the bottom of the case, but only to the lower rib $g$, and accordingly in Fig. 2 the spaces are shown terminating at the lower rib $g$. Each one of the inwardly-extending ribs $g$ has on its inner upper edge a plurality of upwardly-extending equally-spaced locking projections $i$ $i$, a groove $j$ being, if desired, formed between these projections and the side wall of the case, as shown at the right in Fig. 1. The groove $j$ is not essential, so that it is not shown elsewhere in the drawings. Each projection $i$ has one edge face $m$ perpendicular to the rib, and its opposite edge $n$ is inclined, as shown. There are thus formed equally-spaced gaging grooves or notches $o$ between the projections $i$ on the upper horizontal face of each rib, each notch having one side perpendicular and the other inclined. The gaging-notches on one rib are in line with the gaging-notches on the other rib, respectively.

Each plate or electrode $A$ is cut away or recessed, as at $p$, on its side edges near its upper edge, so that two supporting-lips $s$ are formed projecting from its ends. These supporting-lips $s$ (see Fig. 5) are beveled on one side, as at $t$, the angle of the bevel corresponding with that of the inclined side of the gaging-notches. At its lower corners (see Fig. 6) the plate $a$ is notched on one side, as at $u$, the face of the notch being beveled at an angle corresponding with that of the inclined side of the gaging-notches. The inclined face of the notch $u$ is on the same side of the plate or electrode $A$ as the inclined face $t$ of the supporting-lip $s$.

Instead of notching the lower corners of the plate or electrode $A$, its entire lower edge might be beveled, such a modification being indicated in Fig. 3.

In order to place the plates or electrodes $A$ in the case $D$, each plate is lowered into one of the inserting-spaces $h$ $h$ between the ends of the case and the ends of the supporting-plates $K$ until the notches or recesses $p$ in the side edges of the plate or electrode register with the upper ribs $g$, at which position the lower edge of the plate or electrode is just above the projections $i$ $i$ on the lower ribs $g$. The plate or electrode can then be slipped along the ribs until it is brought to the desired position. The plate or electrode is then dropped into its proper gaging-notches $o$, the supporting-lips $s$ at the top of the plate or electrode resting in opposite notches $o$ in the two upper ribs $g$ on opposite sides of the battery-case, and the lower beveled corners of the plate or electrode resting in opposite gaging-notches $o$ in the two lower ribs on opposite sides of the battery-case. In exactly similar manner other plates or electrodes $A$ are placed in the case until all the gaging-notches are occupied.

The formation of the gaging-notches with one perpendicular side and one inclined side, together with the construction of the plate with its coacting faces flat on one side and beveled on the other, is an important feature, since by this means plates or electrodes of different thicknesses may be employed in the same cell or case at different times; but whatever the thickness of the plates or electrodes is they will always be equally well held against lateral movement, since the perpendicular sides $m$ of the notches determine the gage, and each plate or electrode will always seat against both sides of each coacting notch irrespective of its thickness. When the plates or electrodes are thus inserted in the case, the case may be turned over on either side or end, or upside down, without displacing the electrodes, since when in place each electrode is held from lateral displacement by the sides of the gaging-notches, from longitudinal displacement by the side walls of the case, and from vertical displacement by the lower margins of the recesses $p$ encountering the under faces of the upper ribs $g$. At the same time a free circulation of the battery-fluid in the case is provided. The plates or electrodes are held by the ribs above the bottom of the case, so that the fluid may circulate beneath the electrodes, and, in addition, the supporting-plates $K$ and their ribs being made of insulating material, the plates are insulated from each other by their supports.

It is not necessary that the supporting-plates K should be attached to the cell or case D, since they are maintained under ordinary circumstances sufficiently well by the electrodes A, located between them. As soon as one electrode A is in place, the plates K require no further attention while placing the electrodes in position. Preferably the plates K do not rest directly upon the bottom of the case D, but upon strips L, of hard rubber or other suitable elastic insulating material, which distribute the weight of the plates K and of the electrodes upon the bottom of the case. The tops of the plates K may be flush with the top of case D, as shown in Figs. 1 and 2, or below it, as shown in Fig. 4.

While supporting-plates separate from the cell or case are shown provided with the ribs $g$ $g$, it is evident that the ribs might be formed directly on the side walls $f$ of the case. The difficulty, however, of casting the cell with such ribs renders such construction expensive, and consequently the separate plates are preferred.

As shown in Figs. 2 and 4, every other notch $o$ is deeper than the intermediate notches. The object of this arrangement is to identify the positive from the alternate negative electrodes A. A further object is to bring the tops of adjacent electrodes out of line with each other, so as to minimize the danger of short-circuiting in case any conducting material should fall across the plates. The plates or electrodes are thus supported and insulated at their edges; but owing to the lateral sagging of the plates (which frequently occurs, especially where the plates are of considerable length) additional separating-insulators are often necessary between adjacent plates. An ordinary central insulator E for this purpose is shown in Fig. 2. This insulator is made of insulating material, such as hard rubber, and is composed of a longitudinal strip $v$, which hangs between two adjacent plates A, and a hanger $w$, which rests on the upper edge of one of the plates. An improved insulator H is also shown in Fig. 2, which is preferred to the insulator E, since it interferes less with the circulation of the battery-fluid. This insulator H is a short strip of insulating material equal in length to the thickness of one electrode plus twice the distance between adjacent electrodes. To use these insulators H, each electrode is formed with a plurality of elongated through-apertures J, disposed at proper places. (See Figs. 1 and 2.) The insulators H are placed in these apertures and are held in place by downwardly-extending integral locking-extensions I I, (see Fig. 2,) which embrace opposite sides of the electrode when the insulator is in position. The body or central portion of the insulator H is, as shown, of a width less than the length of the apertures J, so that after the insulator is in position in the aperture it may be moved down, so as to lock the extensions I.

The present invention includes also an improved means for connecting together the electrodes of like polarity in a single cell or case and for connecting all of the electrodes of one polarity in one cell or case with those of opposite polarity in an adjacent case, so that a plurality of cells or cases may be connected in series. All of the conducting-wires $x$ from the electrodes A of like polarity are connected with a single connector F. This connector is made of any suitable conducting material, and along one edge it is provided with a plurality of apertures or cavities $y$, (see Fig. 2,) into each of which the free end of one conducting-wire $x$ is inserted and secured by soldering or by other means which will produce an electric joint. The connector contains a sufficient number of these apertures to enable all of the plates of like polarity to be connected therewith. Each connector as a whole is a flat plate slightly curved, as shown. Each connector has a head provided with an eye $z$ extending therethrough.

In order to couple two connectors together, their respective heads are brought together and a coupling-bolt G is passed through their eyes $z$, as shown in Fig. 1. The eyes $z$ in the connectors of the terminal cells or cases of the battery also serve for the attachment of the line-wires. The axis of the eye $z$, it will be observed, extends in a plane perpendicular to the plane of the axes of the apertures $y$, so that two of the connectors can be joined closely together without interfering with or affecting the conducting-wires $x$ $x$, which are in the apertures $y$.

I claim as my invention—

1. In a secondary battery, a plate or electrode thereof having cavities formed therein, each cavity being open at one side of the plate and having a bottom at the other side, said cavities being adapted for the retention of active material, and a reticulated or lattice-work cover, having interstices therethrough, for each of said cavities, substantially as set forth.

2. In a secondary battery, a cover for the active-material cavities of the plates or electrodes thereof, said cover being reticulated or made of lattice-work with interstices therethrough, and having its edges beveled, substantially as set forth.

3. In a secondary battery, a plate or electrode thereof having cavities formed therein, each cavity being open at one side and having a peripheral projecting marginal rim around its open side projecting beyond the general surface of said plate or electrode, in combination with a cover for each of said cavities, said cover having its outer edge or margin beveled, whereby when said cover is in place within a cavity a groove is formed between said beveled outer margin and the side walls of the cavity, into which groove the said projecting marginal ledge may be pressed, substantially as set forth.

4. A secondary-battery cell or case, in combination with inwardly-projecting ribs which extend horizontally along the inner faces of the sides of said cell or case, said ribs being formed with gaging-notches for supporting and retaining the plates or electrodes of the battery, said gaging-notches being formed in the upper horizontal face of each of said ribs, substantially as set forth.

5. A secondary-battery cell or case, in combination with inwardly-projecting ribs within said cell or case and extending along the sides thereof, said ribs being adapted to support the plates or electrodes of the battery, the upper of said ribs being shorter than the interior length of the sides of the case, whereby an inserting-space is provided between the end of said rib and the end of the case, substantially as set forth.

6. A secondary-battery cell or case and inwardly-projecting ribs within said cell or case and extending along the sides thereof, said ribs having gaging-notches and each gaging-notch having one perpendicular and one inclined side, in combination with plates or electrodes supported by said ribs and resting in said notches, said plates having their coacting faces shaped to fit said notches, substantially as set forth.

7. A secondary-battery cell or case and upper and lower projecting ribs which extend along the inner faces of the sides of said cell or case, the upper of said ribs being of a less length than the interior of the case, whereby inserting-spaces are provided between the ends of said ribs and the ends of the case, and all of said ribs being formed with gaging-notches, each notch having one perpendicular and one inclined side, in combination with battery-plates or electrodes adapted to fit in said cell or case, each plate or electrode having recesses formed on its edges near its upper end, in which recesses said upper ribs fit, and having supporting-lips above said recesses which enter the notches in the upper ribs, each lip having one side face beveled and one perpendicular, so as to fit in said notches, and said plates resting above the bottom of the case and fitting in the notches on said lower supporting-ribs, the lower corners of the plates being beveled to fit in said notches, substantially as set forth.

8. A secondary-battery cell or case, in combination with inwardly-projecting ribs within said cell or case and extending along the sides thereof, said ribs having gaging-notches, every other gaging-notch being deeper than the intermediate notches, substantially as set forth.

9. In a secondary-battery cell or case, separate supporting-plates on each side of said cell or case, said plates being provided with inwardly-projecting horizontal ribs formed with gaging-notches on their upper horizontal faces, substantially as set forth.

10. A battery cell or case and strips L along the the bottom thereof, in combination with plates K within said cell or case resting on said strips L, said plates having ribs $g$, provided with gaging-notches $o$, substantially as set forth.

11. A plate or electrode A, having an elongated through-aperture J, in combination with an insulator H of greater length than the thickness of said electrode, said insulator entering said aperture and having integral locking-extensions I at each end, which embrace opposite sides of the electrode, the body or central portion of said insulator being of a width less than the length of said aperture, substantially as set forth.

12. A connector having a plurality of apertures $y$ along one edge for receiving the conducting-wires of the plates or electrodes of like polarity of a secondary battery and an eye $z$ for attachment with other connectors, the axis of said eye being in a plane perpendicular to the plane of the axes of said apertures, substantially as set forth.

In witness whereof I have hereunto signed my name in the presence of two subscribing witnesses.

HARRY H. WARDWELL.

Witnesses:
JOHN ALDRICH,
STELLA L. WARDWELL.